(12) United States Patent
Matsuda

(10) Patent No.: US 11,345,805 B2
(45) Date of Patent: May 31, 2022

(54) RUBBER COMPOSITION AND TRANSMISSION BELT USING SAME

(71) Applicant: BANDO CHEMICAL INDUSTRIES, LTD., Kobe (JP)

(72) Inventor: Hisashi Matsuda, Kobe (JP)

(73) Assignee: BANDO CHEMICAL INDUSTRIES, LTD., Kobe (JP)

( * ) Notice: Subject to any disclaimer, the term of this patent is extended or adjusted under 35 U.S.C. 154(b) by 0 days.

(21) Appl. No.: 16/358,550

(22) Filed: Mar. 19, 2019

(65) Prior Publication Data

US 2019/0211194 A1    Jul. 11, 2019

Related U.S. Application Data

(63) Continuation of application No. PCT/JP2017/021636, filed on Jun. 12, 2017.

(30) Foreign Application Priority Data

Sep. 20, 2016  (JP) .............. JP2016-183022

(51) Int. Cl.
| | |
|---|---|
| C08L 23/16 | (2006.01) |
| F16G 5/04 | (2006.01) |
| F16G 1/06 | (2006.01) |
| F16G 5/20 | (2006.01) |
| F16G 1/10 | (2006.01) |
| F16G 5/08 | (2006.01) |
| F16G 1/28 | (2006.01) |
| C08L 21/00 | (2006.01) |
| C08L 9/00 | (2006.01) |
| C08L 77/10 | (2006.01) |
| C08K 3/04 | (2006.01) |
| C08K 3/36 | (2006.01) |

(52) U.S. Cl.
CPC ............... *C08L 23/16* (2013.01); *C08K 3/04* (2013.01); *C08K 3/36* (2013.01); *C08L 9/00* (2013.01); *C08L 21/00* (2013.01); *C08L 77/10* (2013.01); *F16G 1/06* (2013.01); *F16G 1/10* (2013.01); *F16G 1/28* (2013.01); *F16G 5/04* (2013.01); *F16G 5/08* (2013.01); *F16G 5/20* (2013.01); *C08L 2205/16* (2013.01)

(58) Field of Classification Search
CPC ...... C08L 23/16; C08L 2205/16; C08L 21/00; C08L 9/00; C08L 77/10; F16G 1/06; F16G 5/04; F16G 5/20; F16G 1/10; F16G 1/28; F16G 5/08; C08K 3/04; C08K 3/36
USPC ........................................................ 524/514
See application file for complete search history.

(56) References Cited

U.S. PATENT DOCUMENTS

| | | | | |
|---|---|---|---|---|
| 6,616,558 | B2 * | 9/2003 | South ................. | F16G 1/28 |
| | | | | 156/137 |
| 2002/0042317 | A1 | 4/2002 | South | |
| 2015/0111677 | A1* | 4/2015 | Nishiyama ............. | C08K 5/20 |
| | | | | 474/264 |
| 2016/0040749 | A1* | 2/2016 | Kageyama ............. | B32B 25/10 |
| | | | | 474/8 |
| 2016/0053094 | A1 | 3/2016 | Takeuchi et al. | |

FOREIGN PATENT DOCUMENTS

| | | |
|---|---|---|
| CN | 105073871 A | 11/2015 |
| JP | 2000320618 A | 11/2000 |
| JP | 2004507679 A | 11/2004 |

OTHER PUBLICATIONS

Written Opinion dated Aug. 1, 2017 in application No. PCT/JP2017/021636.
International Search Report dated Aug. 1, 2017 in application No. PCT/JP2017/021636.

\* cited by examiner

*Primary Examiner* — Angela C Scott
(74) *Attorney, Agent, or Firm* — Maschoff Brennan

(57) ABSTRACT

A rubber composition contains a rubber component, polyparaphenylene terephthalamide short fibers, silica, and carbon black. The content of the silica is larger than the content of the carbon black.

20 Claims, 2 Drawing Sheets

2

RUBBER COMPOSITION AND TRANSMISSION BELT USING SAME

CROSS-REFERENCE TO RELATED APPLICATIONS

This is a continuation of International Application No. PCT/JP2017/021636 filed on Jun. 12, 2017, which claims priority to Japanese Patent Application No. 2016-183022 filed on Sep. 20, 2016. The entire disclosures of these applications are incorporated by reference herein.

BACKGROUND

The present invention relates to a rubber composition and a power transmission belt using the rubber composition.

It is known to use a rubber composition containing a rubber component and a reinforcing material in various rubber products. For example, Japanese Unexamined Patent Publication No. 2000-320618 (Patent Document 1) discloses a power transmission belt made of a rubber composition containing a rubber component, polyparaphenylene terephthalamide short fibers, silica, and carbon black.

SUMMARY

The present invention is directed to a rubber composition including a rubber component, polyparaphenylene terephthalamide short fibers, silica, and carbon black. The content of the silica is larger than the content of the carbon black.

The present invention is directed to a power transmission belt including a belt body at least a portion of which is made of the rubber composition of the present invention.

DETAILED DESCRIPTION

Figure 1A:
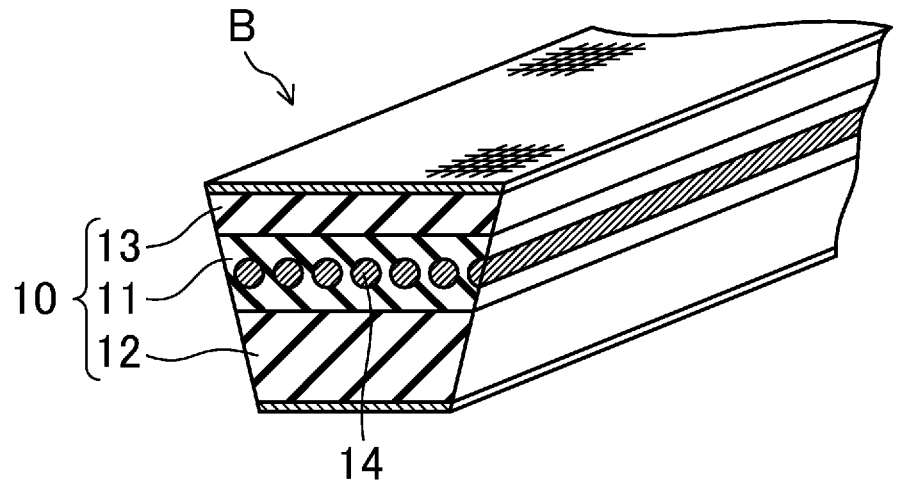
FIG. 1A is a diagram illustrating a perspective view of a portion cut out of a V-belt.

Embodiments will be described in detail below.

A rubber composition according to an embodiment is a crosslinked rubber composition produced by heating and pressing an uncrosslinked rubber composition prepared by mixing and kneading a rubber component and various compounds, including a crosslinking agent, and thereby crosslinking the rubber component. The rubber composition according to the embodiment contains the rubber component, polyparaphenylene terephthalamide short fibers (hereinafter referred to as "PPTA short fibers"), silica, and carbon black.

Examples of the rubber component include ethylene-α-olefin elastomer, chloroprene rubber (CR), chlorosulfonated polyethylene rubber (CSM), and hydrogenated acrylonitrile-butadiene rubber (H-NBR). One kind or two or more kinds of these substances is suitable as the rubber component. More suitably, the main part of the rubber component is an ethylene-α-olefin elastomer. Examples of the ethylene-α-olefin elastomer include an ethylene-propylene-diene monomer (hereinafter referred to as "EPDM"), an ethylene-propylene copolymer (EPR), an ethylene-butene copolymer (EBM), and an ethylene-octene copolymer (EOM). Suitably, the rubber component, the main part of which is the ethylene-α-olefin elastomer, is made of one kind or two or more kinds of these substances. In view of versatility, EPDM is more suitable as the ethylene-α-olefin elastomer. The content of the ethylene-α-olefin elastomer in the rubber component is 50% by mass or more, suitably 90% by mass or more, more suitably 95% by mass or more, and most suitably 100% by mass.

If the rubber component contains the ethylene-α-olefin elastomer, the ethylene content of the ethylene-α-olefin elastomer is suitably 40% by mass or more and 60% by mass or less, and more suitably 50% by mass or more and 55% by mass or less.

If the ethylene-α-olefin elastomer is EPDM, examples of the diene component include ethylidene norbornene (ENB), dicyclopentadiene, and 1,4-hexadiene. Among these substances, ethylidene norbornene is suitable. If the diene component is ethylidene norbornene, the ENB content is suitably 4.0% by mass or more and 5.0% by mass or less, and more suitably 4.3% by mass or more and 4.7% by mass or less.

A Mooney viscosity of the rubber component at 125° C. is suitably 20 $ML_{1+4}$ (125° C.) or more and 40 $ML_{1+4}$ (125° C.), and more suitably 25 $ML_{1+4}$ (125° C.) or more and 30 $ML_{1+4}$ (125° C.) or less. The Mooney viscosity is measured based on JIS K6300.

Examples of the PPTA short fibers as commercially available products include Kevlar 29, Kevlar 49, Kevlar 119, and Kevlar 129 manufactured by Du Pont, and Twaron manufactured by TEIJIN LIMITED. A fiber fineness of a single filament of the PPTA short fibers is suitably 1.0 dtex or more and 2.0 dtex or less. A fiber length of the PPTA short fibers is suitably 0.8 mm or longer and 6 mm or shorter, and more suitably 1 mm or longer and 3 mm or shorter. The content (A) of the PPTA short fibers with respect to 100 parts by mass of the rubber component is suitably 3 parts by mass or more and 20 parts by mass or less, and more suitably 5 parts by mass or more and 15 parts by mass or less. The PPTA short fibers are suitably fibrillated in the rubber composition.

A BET specific surface area of silica is suitably 150 $m^2/g$ or more and 200 $m^2/g$ or less. The BET specific surface area is measured based on ISO 9277. Suitably, the silica is wet precipitated silica produced by a wet precipitation method. The content (B) of the silica with respect to 100 parts by mass of the rubber component is suitably 20 parts by mass or more and 60 parts by mass or less, and more suitably 30 parts by mass or more and 50 parts by mass or less.

Examples of the carbon black include furnace black (such as SAF, ISAF, N-339, HAF, N-351, MAF, FEF, SRF, GPF, ECF, and N-234), thermal black (such as FT and MT), channel black (such as EPC and CC), and acetylene black. Suitably, one kind or two or more kinds of these substances are used as the carbon black. FEF is suitable as the carbon black. The content (C) of the carbon black with respect to 100 parts by mass of the rubber component is suitably 5 parts by mass or more and 35 parts by mass or less, and more suitably 15 parts by mass or more and 25 parts by mass or less.

A sum (A+B) of the content of the PPTA short fibers and the content of the silica with respect to 100 parts by mass of the rubber component is suitably 30 parts by mass or more and 70 parts by mass or less, and more suitably 40 parts by mass or more and 60 parts by mass or less. The content (A) of the PPTA short fibers is suitably smaller than the content (B) of the silica. A ratio (AB) of the content (A) of the PPTA short fibers to the content (B) of the silica is suitably 0.10 or more and 0.40 or less, and more suitably 0.20 or more and 0.30 or less.

A sum (A+C) of the content of the PPTA short fibers and the content of the carbon black with respect to 100 parts by mass of the rubber component is suitably 10 parts by mass or more and 50 parts by mass or less, and more suitably 20 parts by mass or more and 40 parts by mass or less. The content (A) of the PPTA short fibers is suitably smaller than the content (C) of the carbon black. A ratio (A/C) of the content (A) of the PPTA short fibers to the content (C) of the carbon black is suitably 0.30 or more and 0.70 or less, and more suitably 0.40 or more and 0.60 or less.

A sum (B+C) of the content of the silica and the content of the carbon black with respect to 100 parts by mass of the rubber component is suitably 40 parts by mass or more and 80 parts by mass or less, and more suitably 50 parts by mass or more and 70 parts by mass or less. The content (B) of the silica is larger than the content (C) of the carbon black. A ratio (B/C) of the content (B) of the silica to the content (C) of the carbon black is suitably 1.0 or more and 3.0 or less, more suitably 1.5 or more and 2.5 or less, and still more suitably 2.0 or more and 2.5 or less.

The rubber composition according to the embodiment may be crosslinked by using sulfur added as a crosslinking agent, or may be crosslinked by using an organic oxide added as a crosslinking agent, or may further be crosslinked by using sulfur and an organic peroxide added together as crosslinking agents. The content of the crosslinking agent with respect to 100 parts by mass of the rubber component is 1 part by mass or more and 5 parts by mass or less, for example.

The rubber composition according to the embodiment may contain, as other rubber compounds, such substances as a softener, a processing aid, a vulcanization accelerator aid, a vulcanization accelerator, and a co-crosslinking agent.

Examples of the softener include: a mineral oil-based softener such as paraffin oil; a vegetable oil-based softener such as castor oil, cottonseed oil, linseed oil, rapeseed oil, soybean oil, palm oil, coconut oil, peanut oil, Japan wax, rosin, and pine oil; and a petroleum-based softener. One kind or two or more kinds of these substances are suitably used as the softener. The content of the softener with respect to 100 parts by mass of the rubber component is 5 parts by mass or more and 15 parts by mass or less, for example.

Examples of the processing aid include stearic acid, polyethylene wax, and a metal salt of fatty acid. One kind or two or more kinds of these substances are suitably used as the processing aid. The content of the processing aid with respect to 100 parts by mass of the rubber component is 0.5 parts by mass or more and 1.5 parts by mass or less, for example.

Examples of the vulcanization accelerator aid include a metal oxide, such as a zinc oxide (zinc white) and a magnesium oxide, a metal carbonate, a fatty acid, and a derivative thereof. One kind or two or more kinds of these substances are suitably used as the vulcanization accelerator aid. The content of the vulcanization accelerator aid with respect to 100 parts by mass of the rubber component is 3 parts by mass or more and 7 parts by mass or less, for example.

Examples of the vulcanization accelerator include sulfenamide-based, thiuram-based, and dithiocarbamate-based vulcanization accelerators. One kind or two or more kinds of these substances are suitably used as the vulcanization accelerator. The content of the vulcanization accelerator with respect to 100 parts by mass of the rubber component is 2 parts by mass or more and 6 parts by mass or less, for example.

Examples of the co-crosslinking agent include a bismaleimide-based co-crosslinking agent, TAIC, 1,2-polybutadiene, unsaturated carboxylic acid metal salt, oximes, guanidine, and trimethylolpropane trimethacrylate. One kind or two or more kinds of these substances are suitably used as the co-crosslinking agent. The content of the co-crosslinking agent with respect to 100 parts by mass of the rubber component is 4 parts by mass or more and 8 parts by mass or less, for example.

The rubber composition according to the embodiment may contain short fibers other than the PPTA short fibers, such as nylon short fibers, polyester short fibers, cotton short fibers, and meta-aramid short fibers.

A storage normal modulus $E'_1$ (25° C.) of the rubber composition according to the embodiment at 25° C. in the grain direction is suitably 500 MPa or more and 650 MPa or less, and more suitably 550 MPa or more and 600 MPa or less. A storage normal modulus $E'_2$ (25° C.) of the rubber composition according to the embodiment at 25° C. in the cross-grain direction is suitably 50 MPa or more and 100 MPa or less, and more suitably 70 MPa or more and 80 MPa or less.

A ratio ($E'_1$ (25° C.)/$E'_2$ (25° C.)) of the storage normal modulus $E'_1$ (25° C.) of the rubber composition according to the embodiment at 25° C. in the grain direction to the storage normal modulus $E'_2$ (25° C.) of the rubber composition according to the embodiment at 25° C. in the cross-grain direction is suitably 5.00 or more and 10.0 or less, and more suitably 7.00 or more and 8.00 or less.

A storage normal modulus $E'_1$ (100° C.) of the rubber composition according to the embodiment at 100° C. in the grain direction is suitably 350 MPa or more and 550 MPa or less, and more suitably 400 MPa or more and 500 MPa or less. A storage normal modulus $E'_2$ (100° C.) of the rubber composition according to the embodiment at 100° C. in the cross-grain direction is suitably 40 MPa or more and 80 MPa or less, and more suitably 50 MPa or more and 70 MPa or less.

A ratio ($E'_1$ (100° C.)/$E'_2$ (100° C.)) of the storage normal modulus $E'_1$ (100° C.) of the rubber composition according to the embodiment at 100° C. in the grain direction to the storage normal modulus $E'_2$ (100° C.) of the rubber composition according to the embodiment at 100° C. in the cross-grain direction is suitably 6.00 or more and 12.0 or less, more suitably 7.00 or more and 10.0 or less, and still more suitably 7.00 or more and 8.00 or less.

A storage normal modulus $E'_3$ (100° C.) of the rubber composition without the PPTA short fibers according to the embodiment at 100° C. in the grain direction is suitably 40 MPa or more and 70 MPa or less, and more suitably 50 MPa or more and 60 MPa or less.

A ratio (E' (100° C.)/$E'_3$ (100° C.)) of the storage normal modulus E' (100° C.) of the rubber composition according to the embodiment at 100° C. in the grain direction to the storage normal modulus $E'_3$ (100° C.) of the rubber composition without the PPTA short fibers according to the embodiments at 100° C. in the grain direction is suitably 8.00 or more and 20.0 or less, more suitably 9.00 or more and 15.0 or less, and still more suitably 10.0 or more and 12.0 or less.

These storage normal moduli are measured based on JIS K 6394: 2007 at a static strain of 1.5%, a dynamic strain of 0.1%, and a frequency of 10 Hz.

The rubber composition of the embodiment having the above configuration contain the rubber component, PPTA short fibers, silica, and carbon black, and the content (B) of the silica is larger than the content (C) of the carbon black. Such features contribute to a higher elastic modulus of the rubber composition than expected. This is presumably due to the interaction between the PPTA short fibers and the silica.

Figure 1B:
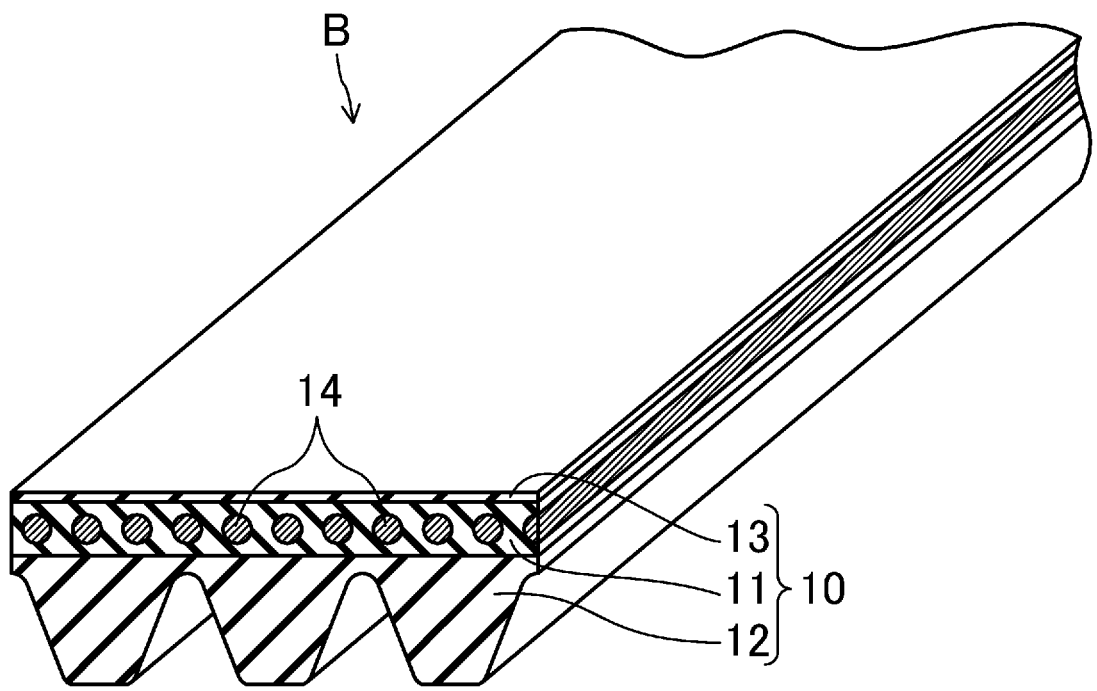
FIG. 1B is a diagram illustrating a perspective view of a portion cut out of a V-ribbed belt.
Figure 2:
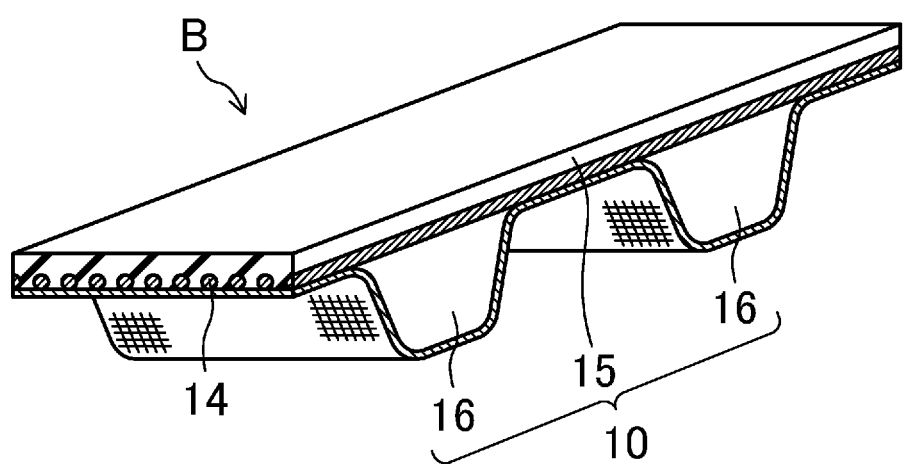
FIG. 2 is a diagram illustrating a perspective view of a portion cut out of a toothed belt.

Having a high elastic modulus, the rubber composition according to the embodiment can be advantageously used as a material which constitutes a belt body of a power transmission belt. For example, a V-belt B shown in FIG. 1A and a V-ribbed belt B shown in FIG. 1B have a belt body 10 which is made of rubber and which is comprised of: an adhesive rubber layer 11 having a cord 14 embedded therein; a compressed rubber layer 12 which constitutes an inner peripheral portion of the belt; and a stretch rubber layer 13 which constitutes an outer peripheral portion of the belt. Suitably, one, two or more, or all of these constituent elements of the belt body 10 are made of the rubber composition according to the embodiment. More suitably, the compressed rubber layer 12, which constitutes the inner peripheral portion of the belt and is required to have a particularly high elastic modulus, is made of the rubber composition according to the embodiment. Further, a toothed belt B shown in FIG. 2 has a belt body 10 which is made of rubber and which is comprised of: a backface rubber layer 15 having a cord 14 embedded therein; and a toothed rubber portion 16. Suitably, one or both of these constituent elements of the belt body 10 is made of the rubber composition according to the embodiment. More suitably, the toothed rubber portion 16, which is required to have a particularly high elastic modulus, is made of the rubber composition according to the embodiment.

Note that the rubber composition according to the embodiment is not limited to the use for a power transmission belt, and may also be used for a rubber product such as a tire or a hose.

EXAMPLES

Tests of the following Example and Comparative Examples 1 to 3 were carried out. The details of each test are also shown in Tables 1 and 2.

Example

EPDM (EP22 manufactured by JSR Corporation with an ethylene content of 54% by mass, an ENB content of 4.5% by mass, and a Mooney viscosity of 27 $ML_{1+4}$ (125° C.)) was used as a rubber component. With respect to 100 parts by mass of this rubber component, the following substances were mixed: 10 parts by mass of PPTA short fibers (Kevlar 29 manufactured by DU PONT-TORAY Co., Ltd., a fiber fineness of 1.7 dtex, and a fiber length of 3 mm); 40 parts by mass of wet precipitated silica (ULTRASIL VN3 manufactured by Evonik Co. Ltd.); 20 parts by mass of FEF (Seast SO manufactured by Tokai Carbon Co., Ltd.); 1.6 parts by mass of sulfur (Seimi OT manufactured by Nippon Kanryu Industry Co., Ltd.) as a crosslinking agent; 10 parts by mass of a processing oil (SUMPAR 2280 manufactured by Japan Sun Oil Company, Ltd.) as a softener; 1 part by mass of stearic acid (stearic acid S50 manufactured by New Japan Chemical Co., Ltd.) as a processing aid; 5 parts by mass of zinc oxide (zinc oxide type 3 manufactured by Hakusui Tech) as a vulcanization accelerator aid; 2 parts by mass of a sulfenamide-based vulcanization accelerator (NOCCELER MSA-G manufactured by Ouchi Shinko Chemical Industrial Co., Ltd.); 2 parts by mass of a thiuram-based vulcanization accelerator (NOCCELER TBT manufactured by Ouchi Shinko Chemical Industrial Co., Ltd.); and 6 parts by mass of m-phenylene dimaleimide (Vulnoc PM manufactured by Ouchi Shinko Chemical Industrial Co., Ltd.) as a co-crosslinking agent. The mixture was kneaded with a Banbury mixer and rolled with calender rolls to prepare an uncrosslinked rubber composition sheet. This uncrosslinked rubber composition sheet was press-molded to form a crosslinked rubber composition sheet for producing specimens for viscoelasticity tests.

From this crosslinked rubber composition sheet, strips for use as the specimens for viscoelasticity tests were cut out such that the longitudinal direction of the strips was in the grain direction and in the cross-grain direction. Based on the JIS K 6394: 2007, a storage normal modulus of each specimen at 25° C. was measured. A storage normal modulus at 100° C. in the grain direction was also measured. In the measurements, the static strain was set to be 1.5%, the dynamic strain to be 0.10%, and the frequency to be 10 Hz. A cross-section of the crosslinked rubber composition sheet was observed with a microscope to find that the PPTA short fibers were fibrillated.

A storage normal modulus, in the grain direction, of the crosslinked rubber composition without PPTA short fibers was measured at 100° C.

Comparative Example 1

The same processing as in Example was carried out in preparing an uncrosslinked rubber composition sheet except that, instead of the PPTA short fibers, aramid short fibers of copolyparaphenylene-3,4'-oxydiphenylene terephthalamide (Technora, manufactured by TEIJIN LIMITED, with a fiber fineness of 1.7 dtex and a fiber length of 3 mm) were contained. Storage normal moduli at 25° C. in the grain direction and the cross-grain direction, and storage normal moduli at 100° C. in the grain direction and the cross-grain direction were measured.

Comparative Example 2

The same processing as in Example was carried out in preparing an uncrosslinked rubber composition sheet except that no silica was contained and that 65 parts by mass of FEF with respect to 100 parts by mass of the rubber component were contained. Storage normal moduli at 25° C. in the grain direction and the cross-grain direction, and storage normal moduli at 100° C. in the grain direction and the cross-grain direction were measured.

A storage normal modulus, in the grain direction, of the crosslinked rubber composition not containing PPTA short fibers was measured at 100° C.

Comparative Example 3

The same processing as in Comparative Example 1 was carried out in preparing an uncrosslinked rubber composition sheet except that no silica was contained and that 65 parts by mass of FEF with respect to 100 parts by mass of the rubber component were contained. Storage normal moduli at 25° C. in the grain direction and the cross-grain direction, and storage normal moduli at 100° C. in the grain direction and the cross-grain direction were measured.

TABLE 1

|  |  | Example | Comparative Example 1 | Comparative Example 2 | Comparative Example 3 |
|---|---|---|---|---|---|
| Rubber Component | EPDM | 100 | 100 | 100 | 100 |
| Short Fibers (A) | PPTA Short Fibers | 10 |  | 10 |  |
|  | Aramid Short Fibers (Technora) |  | 10 |  | 10 |
| Silica (B) | Wet Precipitated Silica | 40 | 40 |  |  |
| Carbon Black (C) | FEF | 20 | 20 | 65 | 65 |
| Softener | Processing Oil | 10 | 10 | 10 | 10 |
| Crosslinking Agent | Sulfur | 1.6 | 1.6 | 1.6 | 1.6 |
| Processing Aid | Stearic Acid | 1 | 1 | 1 | 1 |
| Vulcanization Accelerator Aid | Zinc Oxide | 5 | 5 | 5 | 5 |
| Vulcanization Accelerator | Sulfenamide-Based Vulcanization Accelerator | 2 | 2 | 2 | 2 |
|  | Thiuram-Based Vulcanization Accelerator | 2 | 2 | 2 | 2 |
| Co-Crosslinking Agent | m-Phenylenedimaleimide | 6 | 6 | 6 | 6 |
|  | A + B | 50 | 50 | — | — |
|  | A/B | 0.25 | 0.25 | — | — |
|  | A + C | 30 | 30 | 75 | 75 |
|  | A/C | 0.50 | 0.50 | 0.15 | 0.15 |
|  | B + C | 60 | 60 | — | — |
|  | B/C | 2.0 | 2.0 | — | — |

TABLE 2

|  |  | Example | Comparative Example 1 | Comparative Example 2 | Comparative Example 3 |
|---|---|---|---|---|---|
| Storage Normal Modulus (MPa) | $E'_1(25°\,C.)$: Grain Direction | 586 | 404 | 391 | 411 |
|  | $E'_2(25°\,C.)$: Cross-Grain Direction | 75.7 | 72.3 | 75.9 | 70.7 |
|  | $E'_1(25°\,C.)/E'_2(25°\,C.)$ | 7.74 | 5.59 | 5.15 | 5.81 |
|  | $E'_1(100°\,C.)$: Grain Direction | 447 | 301 | 299 | 314 |
|  | $E'_2(100°\,C.)$: Cross-Grain Direction | 60.0 | 56.2 | 60.2 | 55.1 |
|  | $E'_1(100°\,C.)/E'_2(100°\,C.)$ | 7.45 | 5.36 | 4.97 | 5.70 |
|  | $E'_3(100°\,C.)$: No Short Fibers Grain Direction | 41.4 | 41.4 | 41.4 | 41.4 |
|  | $E'_1(100°\,C.)/E'_3(100°\,C.)$ | 10.8 | 7.27 | 7.22 | 7.58 |

The test results of the above Example and Comparative Examples 1 to 3 show that the rubber composition of Example containing the PPTA short fibers and silica is significantly higher in the elastic modulus in the grain direction than the rubber composition of Comparative Example 1 containing a different kind of aramid short fibers, the rubber composition of Comparative Example 2 containing PPTA short fibers but not containing silica, and the rubber composition of Comparative Example 3 containing a different kind of aramid short fibers but not containing silica.

The embodiment has been described above as example techniques of the present disclosure, in which the attached drawings and the detailed description are provided. As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential. Since the embodiment described above is intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

What is claimed is:

1. A rubber composition comprising:

a rubber component, polyparaphenylene terephthalamide short fibers, silica, and carbon black, a content of the polyparaphenylene terephthalamide short fibers with respect to 100 parts by mass of the rubber component is 10 parts by mass or more and 35 parts by mass or less, a content of the silica with respect to 100 parts by mass of the rubber component is 40 parts by mass or more and 50 parts by mass or less, a content of the carbon black with respect to 100 parts by mass of the rubber component is 15 parts by mass or more and 25 parts by mass or less, and the content of the silica is larger than the content of the carbon black such that the ratio of the content of the silica to the content of the carbon black is 2.0 or more and 3.0 or less.

2. The rubber composition of claim 1, wherein a main part of the rubber component is ethylene-α-olefin elastomer, chloroprene rubber, chlorosulfonated polyethylene rubber, or hydrogenated acrylonitrile-butadiene rubber.

3. The rubber composition of claim 1, wherein the content of the polyparaphenylene terephthalamide short fibers with respect to 100 parts by mass of the rubber component is 20 parts by mass or less.

4. The rubber composition of claim 1, wherein
a sum of the content of the silica and the content of the carbon black with respect to 100 parts by mass of the rubber component is 45 parts by mass or more and 70 parts by mass or less.

5. The rubber composition of claim 1, wherein
a sum of the content of the polyparaphenylene terephthal amide short fibers and the content of the silica with respect to 100 parts by mass of the rubber component is 50 parts by mass or more and 60 parts by mass or less.

6. The rubber composition of claim 1, wherein
a ratio of the content of the polyparaphenylene terephthalamide short fibers to the content of the silica is 0.10 or more and 0.40 or less.

7. The rubber composition of claim 1, wherein
a sum of the content of the polyparaphenylene terephthalamide short fibers and the content of the carbon black with respect to 100 parts by mass of the rubber component is 18 parts by mass or more and 50 parts by mass or less.

8. The rubber composition of claim 1, wherein
a ratio of the content of the polyparaphenylene terephthal amide short fibers to the content of the carbon black is 0.30 or more and 0.70 or less.

9. The rubber composition of claim 1, wherein
the polyparaphenylene terephthal amide short fibers are fibrillated in the rubber composition.

10. The rubber composition of claim 1, wherein
the content of the polyparaphenylene terephthalamide short fibers with respect to 100 parts by mass of the rubber component is about 10 parts by mass.

11. The rubber composition of claim 10, wherein the silica is wet precipitated silica.

12. The rubber composition of claim 10, wherein the silica includes specific surface area BET of from about 150 $m^2/g$ to about 200 $m^2/g$.

13. The rubber composition of claim 10, further comprising:
a content of softener with respect to 100 parts by mass of the rubber component is 5 parts by mass or more and 15 parts by mass or less;
a content of processing aid with respect to 100 parts by mass of the rubber component is 0.5 parts by mass or more and 1.5 parts by mass or less;
a content of vulcanization accelerator aid with respect to 100 parts by mass of the rubber component is 3 parts by mass or more and 7 parts by mass or less;
a content of vulcanization accelerator with respect to 100 parts by mass of the rubber component is 2 parts by mass or more and 6 parts by mass or less; and
a content of co-crosslinking agent with respect to 100 parts by mass of the rubber component is 4 parts by mass or more and 8 parts by mass or less.

14. The rubber composition of claim 13, wherein:
the softener is a mineral oil, vegetable oil, or petroleum oil;
the processing aid is stearic acid, polyethylene wax, or a metal salt of a fatty acid;
the vulcanization accelerator aid is a metal oxide, metal carbonate, or a fatty acid;
the vulcanization accelerator is a sulfenamide, thiuram, or dithiocarbamate; and
the co-crosslinking agent is a bismaleimide, triallyl isocyanurate, 1,2-polybutadiene, unsaturated carboxylic acid metal salt, oxime, guanidine, or trimethylolpropane trimethacrylate.

15. The rubber composition of claim 1, wherein the silica is wet precipitated silica.

16. The rubber composition of claim 1, wherein the silica includes specific surface area BET of from about 150 $m^2/g$ to about 200 $m^2/g$.

17. The rubber composition of claim 1, further comprising:
a content of softener with respect to 100 parts by mass of the rubber component is 5 parts by mass or more and 15 parts by mass or less;
a content of processing aid with respect to 100 parts by mass of the rubber component is 0.5 parts by mass or more and 1.5 parts by mass or less;
a content of vulcanization accelerator aid with respect to 100 parts by mass of the rubber component is 3 parts by mass or more and 7 parts by mass or less;
a content of vulcanization accelerator with respect to 100 parts by mass of the rubber component is 2 parts by mass or more and 6 parts by mass or less; and
a content of co-crosslinking agent with respect to 100 parts by mass of the rubber component is 4 parts by mass or more and 8 parts by mass or less.

18. The rubber composition of claim 17, wherein:
the softener is a mineral oil, vegetable oil, or petroleum oil;
the processing aid is stearic acid, polyethylene wax, or a metal salt of a fatty acid;
the vulcanization accelerator aid is a metal oxide, metal carbonate, or a fatty acid;
the vulcanization accelerator is a sulfenamide, thiuram, or dithiocarbamate; and
the co-crosslinking agent is a bismaleimide, triallyl isocyanurate, 1,2-polybutadiene, unsaturated carboxylic acid metal salt, oxime, guanidine, or trimethylolpropane trimethacrylate.

19. The rubber composition of claim 1, further comprising a ratio of a storage normal modulus at 100° C. in a grain direction to a storage normal modulus at 100° C. in a cross-grain direction which is greater than a corresponding ratio in a rubber composition comprising aramid short fibers other than the polyparaphenylene terephthalamide short fibers.

20. A power transmission belt including a belt body at least a portion of which is made of the rubber composition of claim 1.

* * * * *